(12) United States Patent
Berry et al.

(10) Patent No.: US 7,843,185 B2
(45) Date of Patent: Nov. 30, 2010

(54) CONFIGURABLE INPUT HIGH POWER DC-DC CONVERTER

(75) Inventors: K. Joel Berry, Flint, MI (US); Josh Anzicek, Lapeer, MI (US)

(73) Assignee: Kettering University, Flint, MI (US)

( * ) Notice: Subject to any disclaimer, the term of this patent is extended or adjusted under 35 U.S.C. 154(b) by 258 days.

(21) Appl. No.: 12/139,891

(22) Filed: Jun. 16, 2008

(65) Prior Publication Data
US 2009/0001813 A1    Jan. 1, 2009

Related U.S. Application Data

(60) Provisional application No. 60/943,860, filed on Jun. 14, 2007.

(51) Int. Cl.
*G05F 1/00* (2006.01)
(52) U.S. Cl. .................................................. 323/283
(58) Field of Classification Search .................. 323/241, 323/271, 282, 283, 284, 285, 286; 307/31
See application file for complete search history.

(56) References Cited

U.S. PATENT DOCUMENTS

| | | | |
|---|---|---|---|
| 7,098,634 B1 | 8/2006 | Yu | |
| 7,164,310 B1 * | 1/2007 | Nauleau et al. | 327/540 |
| 7,173,403 B1 | 2/2007 | Chen et al. | |
| 7,288,924 B2 * | 10/2007 | Trandafir et al. | 323/283 |
| 7,317,625 B2 * | 1/2008 | Zhang et al. | 363/89 |
| 2005/0218876 A1 * | 10/2005 | Nino | 323/282 |
| 2006/0119337 A1 | 6/2006 | Takahashi et al. | |
| 2007/0018626 A1 | 1/2007 | Chi | |

OTHER PUBLICATIONS

International Search Report, 3 pages.

* cited by examiner

*Primary Examiner*—Bao Q Vu
*Assistant Examiner*—Nguyen Tran
(74) *Attorney, Agent, or Firm*—Dickinson Wright PLLC

(57) ABSTRACT

The invention relates to electrical power conversion and more specifically to a high power direct current-to-direct current (DC-DC) power converter. The DC-DC converter includes a plurality of input ports for receiving a plurality of inputs, each having current, voltage, and power, which can be selectively configured by a user. The DC-DC converter further includes a plurality of output channels for outputting current, voltage, and power, which may be selectively configured by a user. By allowing a user to configure both the inputs and outputs, the DC-DC converter may be utilized with wide variation of power conversion applications.

6 Claims, 2 Drawing Sheets

CONFIGURABLE INPUT HIGH POWER DC-DC CONVERTER

CROSS REFERENCE TO RELATED APPLICATION

This application claims the priority benefit of U.S. provisional patent application Ser. No. 60/943,860, filed Jun. 14, 2007. The 60/943,860 provisional application is incorporated herein by reference, in its entirety, for all purposes.

FIELD OF THE INVENTION

The present invention pertains generally to the field of direct current-to-direct current (or "DC-DC") converter circuits, and more particularly to a DC-DC converter that is reconfigurable to accept input electrical power at plural different DC voltages, and reconfigurable to produce output electrical power at plural different DC voltages.

BACKGROUND INFORMATION

A DC-DC converter receives as an input DC electrical power at a nominal input voltage and provides as an output DC electrical power at an output voltage that is different from, and typically higher than, the nominal input voltage.

Conventionally, a given converter is designed for manufacture so as to accept a predetermined input voltage and will operate correctly only so long as the input voltage remains substantially at that predetermined value. If DC-DC conversion of a new, different input voltage is required, a different converter suitable to the new input voltage must be obtained, either purchased on the market or designed and manufactured from scratch.

Likewise, if it is desired to change the output voltage of a given DC-DC converter, conventional converters do not function this way readily. Nor has the combination of both a changeable input voltage and a changeable output voltage been conventionally available in a DC-DC converter.

What is needed is a DC-DC converter that is automatically reconfigurable to accept input electrical power at plural different DC voltages, and to produce output electrical power at plural, selectable different DC voltages.

SUMMARY OF THE INVENTION

According to one embodiment of the present invention, a multi-output DC-DC converter has the ability for each of the outputs to configure respective input parameters, such as maximum input power and maximum and minimum input voltage ranges and the ability for each of the outputs to configure output parameters, such as output voltage, output current, and output power.

BRIEF DESCRIPTION OF THE DRAWING

Other advantages of the present invention will be readily appreciated, as the same becomes better understood by reference to the following detailed description when considered in connection with the accompanying drawing.

DETAILED DESCRIPTION OF THE INVENTION

Figure 1:
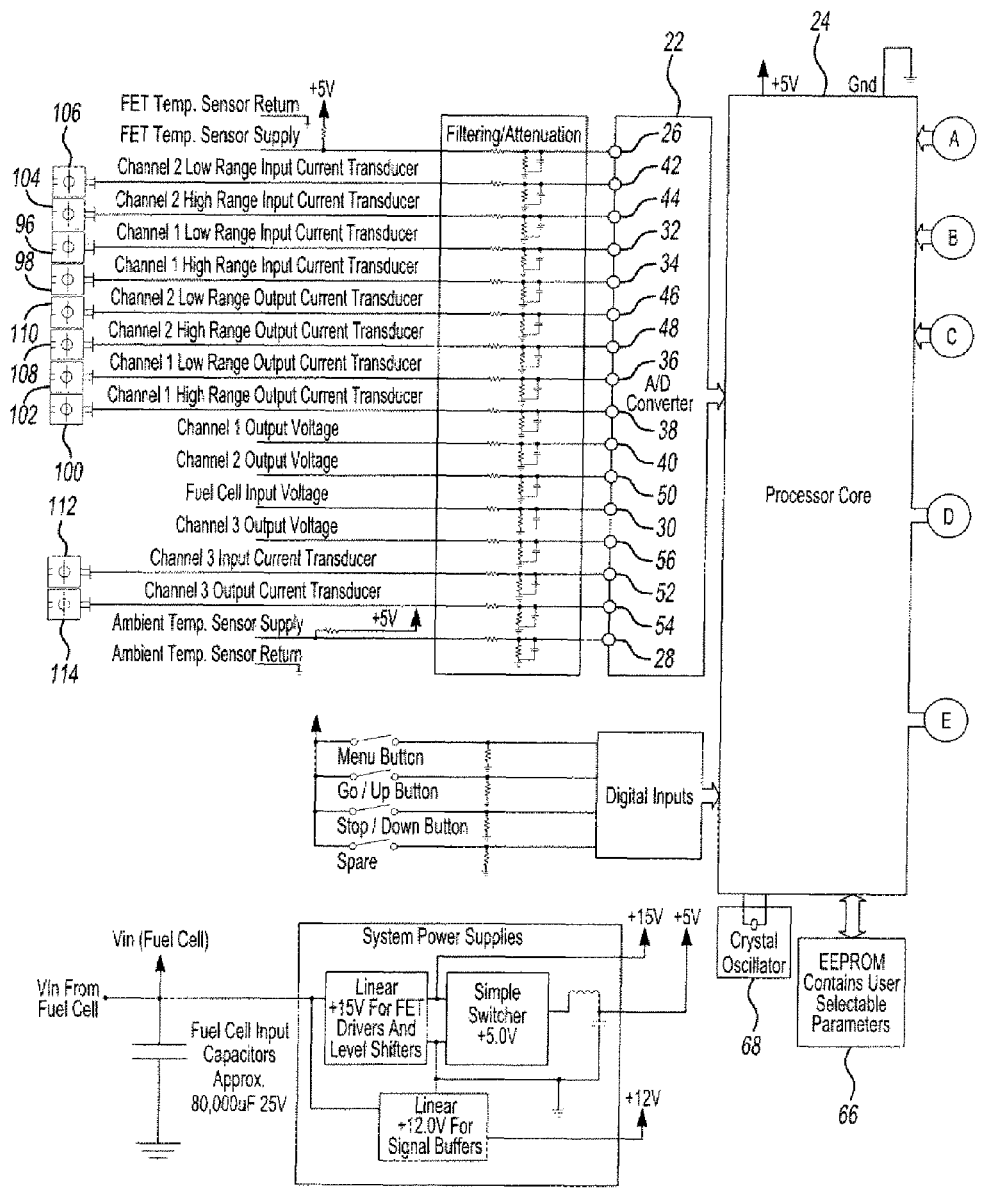
FIG. 1 shows a schematic diagram of a converter control center with logic power supplies and sensing in a DC-DC converter having multiple input voltages and multiple output voltages according to the subject invention.
Figure 1A:
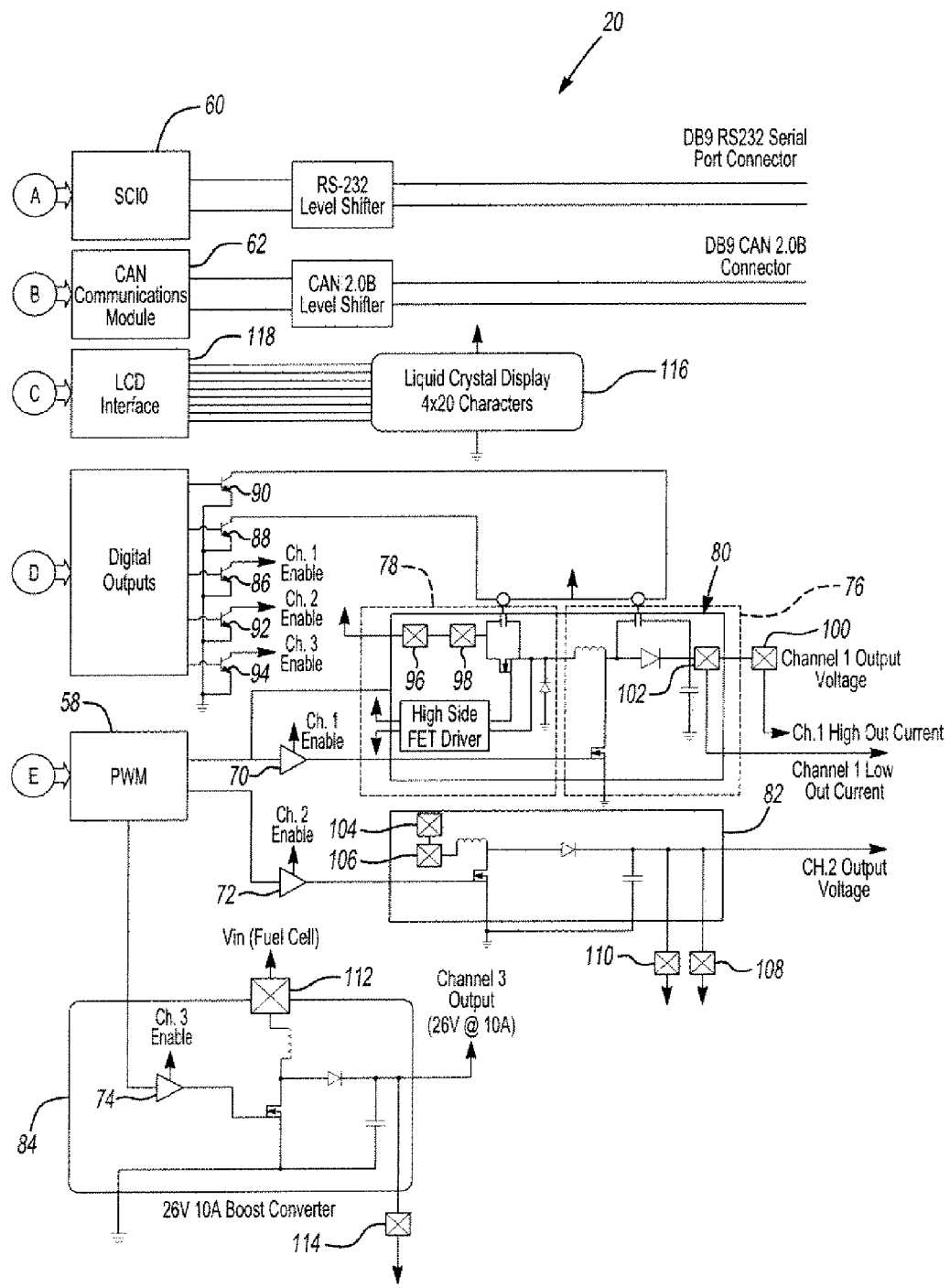
FIG. 1A shows a schematic diagram of communications, outputs and power conversion stages in a DC-DC converter having multiple input voltages and multiple output voltages according to the subject invention.

Referring to FIG. 1, wherein like numerals indicate corresponding parts throughout the several views, a direct current-to-direct current (DC-DC) power converter 20 is generally shown. The DC-DC power converter 20 includes an analog-to-digital (A-D) converter 22, a processor module 24, and a pulse width modulation (PWM) module 58. The A-D converter 22 receives a plurality of analog power signals and analog current signals and electronically converts them into a plurality of digital power signals and digital current signals. The A-D converter 22 includes a plurality of first channel ports 32, 34, 36, 38, 40, a plurality of second channel ports 42, 44, 46, 48, 50, and a plurality of third channel ports 52, 54, 56. Additionally, the A-D converter 22 includes an FET temperature port 26 for receiving a field effect transistor (FET) temperature signal, an ambient temperature port 28 for receiving an ambient temperature signal and a fuel cell voltage port 30 for receiving a fuel cell input voltage signal from a fuel cell (not shown). Although the FIGURE illustrates a fuel cell input voltage port for receiving a fuel cell input voltage, other DC voltage sources may be used including, but not limited to, fuel cells, batteries, flywheels, solar energy, ultra-capacitors, electric generator, etc.

The plurality of first channel 32, 34, 36, 38, 40 includes a first channel low input current port 32 for receiving an analog first channel low input current signal and a first channel high input current port 34 for receiving an analog first channel high input current signal. A first channel low output current port 36 receives an analog first channel low output current signal and a first channel high output current port 38 receives an analog first channel high output current signal. A first channel output power port 40 is included for receiving a first channel output power signal, which may be utilized in a feedback control system to monitor and regulate the first channel output power, as discussed further below.

The plurality of second channel ports 42, 44, 46, 48, 50 includes a second channel low input current port 42 for receiving an analog second channel low input current signal and a second channel high input current port 44 for receiving an analog second channel high input current signal. A second channel low output current port 46 receives an analog second channel low output current signal and a second channel high output current port 48 receives an analog second channel high output current signal. A second channel output power port 50 is included for receiving a second channel output power signal, which may be used utilized in a similar feedback manner as that of the first channel output power signal.

The plurality of third channel ports 52, 54, 56 includes a third channel input current port 52 for receiving an analog third channel input current signal and a third channel output current port 54 for receiving an analog third channel output current signal. A third channel output power port 56 is included for receiving a third channel output power signal, which may be used in a similar feedback manner as that of the first and second channel output power signals.

The processor module 24 is in electrical communication with the A-D converter 22 for receiving the digital power and digital current signals. The processor module 24 may output a plurality of electrical signals including a first channel select signal, a second channel select signal, a third channel select signal and a PWM frequency signal. The digital signals electrically may control various electrical modules 22, 58, 60, 62, 64, 66 included in the DC-DC power converter 20, as discussed in greater detail below. Additionally, a crystal oscillator 68 is in communication with the processor module 24 for operating the processor module 24 at a predetermined frequency.

The PWM module 58 is in communication with the processor module 24 and is responsive to the PWM frequency in order to output a PWM power signal. The processor module 24 generates the PWM frequency signal such that power level of the PWM power signal is substantially equal to the power level of the remotely connected fuel cell. Accordingly, the input voltage delivered to the DC-DC power converter 20 by the fuel cell (or other electrical power source) is substantially equal to the power level output by the PWM module 58.

The DC-DC converter 20 further includes a first channel field effect transistor (FET) 70 and second channel FET 72 and a third channel FET 74. The first channel FET 70 is in communication with the PWM module 58 for filtering the PWM power signal and for outputting a first channel filtered PWM power signal The second channel FET 72 is in communication with the PWM module 58 for filtering the PWM power signal and for outputting a second channel filtered PWM power signal. The third channel FET 74 is in communication with the PWM module 58 for filtering the PWM power signal and for outputting a third channel filtered PWM power signal. Each of the first, second and third PWM power signals can be used to independently power individual DC loads, such as a DC motor, that require a power level being different from that of the fuel cell, as discussed in greater detail below.

The DC-DC converter 20 further includes a first boost power circuit 76 and a buck power circuit 78. The first boost power circuit 76 is in communication with the first channel FET 70 for receiving the first channel filtered PWM power signal. When enabled by the processor module 24, the first boost power circuit 76 can increases the power level of the first channel filtered PWM power signal to output a first channel output power signal to be used by a first DC load. Specifically, the first channel output power signal has a power level ranging from 0 W to 3000 W. The buck boost power circuit is in communication with the first boost power circuit 76 and the first channel FET 70 for receiving the first channel filtered PWM power signal similar to the first boost power circuit 76. When enabled by the processor module 24, however, the buck power circuit 78 can decrease the power level of the first channel filtered PWM signal. Accordingly an output power signal can be utilized by a DC load requiring a lower power level than the power level provided by the fuel cell. The power level of the first channel output power signal delivered by the buck power circuit 78 ranges from 0 W to 3000 W. The first channel output power signal generated by either of the first boost power circuit 76 or the buck power circuit 78 is returned to the processor module 24 through the first channel output power port 40. The feedback path allows the processor module 24 to monitor the first channel output power signal and to adjust the operation of the PWM module 58, the first boost power circuit 76 and the buck power circuit 78. The first boost power circuit 76 and the buck power circuit 78 are connected in a manner that each operate independent from one another, i.e., a buck-boost circuit 80, while still outputting the first channel output power signal that may be utilized by a DC load. the processor module 24 being in communication with the first boost power circuit 76 and the buck power circuit 78 for receiving the first channel output power signal indicating the power output by one of the first boost power circuit 76 and the buck power circuit 78.

The DC-DC converter 20 further includes a second boost power circuit 82 being in communication with the PWM module 58 for receiving the second channel filtered PWM power signal. Similar to the first boost power circuit 76, the second boost power circuit 82 increases the power level of the second channel filtered PWM power signal. Accordingly, the second boost power circuit 82 can output a second channel output power signal having a power level ranging from 0 W to 5000 W. The second channel output power signal generated by the second boost power circuit 82 is returned to the processor module 24 through the second channel output power port 50. The feedback path allows the processor module 24 to monitor the second channel output power signal and to adjust the operation of the PWM module 58 and the second boost power circuit 82.

The DC-DC converter 20 includes a third boost power circuit 84 being in communication with the PWM module 58 for receiving the third channel filtered PWM power signal. Similar to the first and second boost power circuit 76, 82, the third boost power circuit 84 increases the power level of the third channel filtered PWM power signal. Accordingly, the third boost power circuit 84 can output a third channel output power signal having a power level ranging from 0 W to 400 W. The third channel output power signal generated by the third boost power circuit 84 is returned to the processor module 24 through the third channel output power port 56. The feedback path allows the processor module 24 to monitor the third channel output power signal and to adjust the operation of the PWM module 58 and the third boost power circuit 84.

A plurality of transistors 70, 86, 88, 90, 92, 94 is included to enable i.e., switch on and off the first boost power circuit 76, the buck boost power circuit, the second boost power circuit 82 and the third boost power circuit 84. Specifically, a first channel transistor 86 is in communication with the processor module 24 and the first channel FET 70. The boost transistor 88 is in communication with the processor module 24 and the first boost power circuit 76. The buck transistor 90 is in communication with the processor module 24 and the buck power circuit 78. The processor module 24 enables the first channel FET 70 by outputting the first channel select signal to the first channel transistor 86, which switches on the first channel FET 70 to deliver the first channel filtered PWM signal to the buck-boost circuit 80. After enabling the first channel FET 70, the processor module 24 determines whether to enable the first boost power circuit 76 or the buck power circuit 78. When a DC load attached to the buck-boost circuit 80 requires power being less than power provided by the fuel cell, the processor module 24 outputs the buck signal to enable the buck power circuit 78 for decreasing the power level of the first channel filtered PWM signal. However, if the DC load requires power being greater than power provided by the fuel cell, the processor module 24 outputs a boost signal to enable the first boost power circuit 76 for increasing the power level of the first channel filtered PWM signal.

The second channel transistor 92 is in communication with the processor module 24 and the second channel FET 72. When a DC load is connected to the second boost power circuit 82, the processor module 24 outputs the second channel select signal to the second channel transistor 92 to switch on the second channel FET 72, thereby delivering the second channel filtered PWM signal to the second boost power circuit 82.

The third channel transistor 94 is in communication with the processor module 24 and the third channel FET 74. When a DC load is connected to the third boost power circuit 84, the processor module 24 outputs the third channel select signal to the third channel transistor 94 to switch on the third channel FET 74, thereby delivering the third channel filtered PWM signal to the third boost power circuit 84.

The DC-DC converter 20 includes a plurality of sensors 96, 98, 100, 102, 104, 106, 108, 110, 112, 114 for sensing input currents, output currents at various locations of the DC-DC converter 20. In regards to the first channel sub-circuit, the DC-DC converter 20 includes a first channel high input current sensor 98, a first channel low input currents sensor, a first channel high output sensor, and a first channel low output sensor. The first channel high input current sensor 98 is in communication with the buck power circuit 78 and the first channel high input current port 34 for sensing high level current output from the fuel cell. The first channel high input current sensor 98 outputs an analog first channel high input current signal to the first channel high input current port 34 of the A-D converter 22. The first channel low input sensor is in communication with the buck power circuit 78 and the first channel low input current port 32. The sensor detects low level current output from the fuel cell and, in response, outputs an analog first channel low input current signal to the first channel low input port. The first channel high output current sensor 100 is in communication with the first boost power circuit 76 and the first channel high output current port 38. The sensor detects high level current output by the first boost power circuit 76 and, in response, outputs an analog first channel high output current signal to first channel high output current port 38 of the A-D converter 22. The first channel low output current sensor 102 is in communication with the first boost power circuit 76 and the first channel output current port. The sensor detects low level current output by the first boost power circuit 76 and, in response, outputs the analog first channel low output current signal to the first channel low output current port 36.

In regards to the second channel sub-circuit, the DC-DC converter 20 includes a second channel high input current sensor 104, a second channel low input currents sensor, a second channel high output sensor, and a second channel low output sensor. The second channel high input current sensor 104 is in communication with the second boost power circuit 82 and the second channel high input current port 44. The sensor detects high level current output from the fuel cell and, in response, outputs the analog second channel low input current signal to the A-D converter 22. The second channel low input current sensor 106 is in communication with the second boost power circuit 82 and the second channel low input current port 42. The sensor detects low level current output from the fuel cell and, in response, outputs the analog second channel low range input current signal to A-D converter 22. The second channel high output current sensor 108 is in communication with the second boost power circuit 82 and the second channel high output current port 48. The sensor detects high level current output by the second boost power circuit 82 and, in response, outputs the analog second channel high output current signal to the A-D converter 22. The second channel low output current sensor 110 is in communication with the second boost power circuit 82 and the second channel low output current port 46. The sensor detects low level current output by the second boost power circuit 82 and, in response, outputs the analog second channel low output current signal to the A-D converter 22.

Regarding the third channel sub-circuit, the DC-DC converter 20 includes a third channel input current sensor 112 and a third channel output sensor. The third channel input current sensor 112 is in communication with the third boost power circuit 84 and the third channel input current port 52. The sensor detects current output by the fuel cell and, in response, outputs the analog third channel input current signal to the A-D converter 22. The third channel output current sensor 114 is in communication with the third boost power circuit 84 and the third channel output current port 54. The sensor detects current output by the third boost power circuit 84 and, in response, outputs the analog third channel output current signal to the A-D converter 22.

The DC-DC converter 20 allows for configurable predetermined input limits and configurable predetermined output limits to provide a user with maximum flexibility for applications requiring AC and DC power. Specifically, the DC-DC converter 20 allows a user to specify the maximum power to be delivered to the DC-DC converter 20 from the fuel cell. Additionally, a user can specify fuel cell operating voltage and a minimum fuel cell operating voltage. Accordingly, if the voltage of the fuel cell increases above or decreases below the specified voltage ranges, the processor module 24 will take safety measures to prevent damage to the DC-DC converter 20, such as disenabling one of the first, second, or third channel sub-circuits or shutting down the entire DC-DC converter 20. The DC-DC converter 20 also provides for user configurable first, second, and third output power levels depending on the desired electrical application. Specifically, a user can select the first channel output power signal to have a power level from 0 W to 3000 W, the second channel output power signal to have a power level from 0 W to 5000 W, and the third channel output power signal to have a power level from 0 W to 400 W. Additionally, a user can select which channel sub-circuit takes priority and can assign a ratio value for the available power to be shared between the first boost power circuit 76, the buck power circuit 78, the second boost power circuit 82, and the third boost power circuit 84 if the maximum input power limit is exceeded. The DC-DC converter 20 further allows a user to input a power ramp rate, which may protect the fuel cell from damaging slew rates. Specifically, a user can input the range of voltage gain or decrease and the amount of time in which the DC-DC converter 20 will achieve that voltage gain or decrease.

The DC-DC converter 20 includes a serial communications module 60, a broadcast communications module 62 and an LCD module 64, each allowing a user to configure the input parameters and output parameters mentioned above. The serial communications module 60, such as a RS-232 and/or SC10 module, is in communication with the processor module 24 for receiving the predetermined inputs and predetermined outputs from a first remotely located input device. After receiving the predetermined inputs and outputs, the serial communications module 60 delivering the predetermined signals to the processor module 24.

The broadcast communications module 62, such as a controller area network (CAN) module, is in communication with the processor module 24. Similar to the serial communications module 60 above, the broadcast communications module 62 receives receiving the predetermined inputs and predetermined outputs from a first remotely located input device. After receiving the predetermined inputs and outputs, the serial communications module 60 delivering the predetermined signals to the processor module 24.

The liquid crystal display (LCD 116) module is in communication with the processor module 24. The LCD module 64 includes a LCD interface 118 and a LCD 116. The LCD interface 118 allows a user to select the predetermined inputs and outputs. Subsequently, the LCD interface 118 delivers the predetermined input and outputs to the processor module 24. The LCD 116 is in communication with the LCD interface 118 and may display the predetermined inputs and outputs selected by the user.

The DC-DC converter 20 includes a memory module 66 for storing values associated with the predetermined inputs and outputs. The processor module 24 is in communication with the memory module 66 reading the user selected predetermined inputs and outputs from memory. Furthermore, the processor module 24 compares at least one of the predetermined stored values to at least one of the plurality of digital power and current signals that are returned to the A-D converter 22 and ultimately the processor module 24. Based on the comparison between the predetermined inputs and outputs selected by the user and the feedback digital power and current signals indicating the real time power levels and currents levels output by the DC-DC converter 20, the processor module 24 can generate one of the select signals to initiate at least one of the first channel, the second channel and the third channel FETs to achieve an output power signal specified by the predetermined stored values. Accordingly, a multi-output DC-DC converter 20 is provided allowing for configurable input parameters for each output, such as maximum input power and maximum and minimum input voltage ranges and configurable output parameters for each output, such as output voltage, output current, and output power.

As would be understood by persons of ordinary skill in the art, many modifications and variations of the described embodiments are possible in light of the above teachings and the invention may be practiced otherwise than as specifically described while within the scope of the appended claims. These described embodiments should be interpreted to cover any combination in which the inventive novelty exercises its utility.

What is claimed is:

1. A direct current-to-direct current (DC-DC) power converter comprising:
    an analog-to-digital converter adapted to be connected across a fuel cell to receive a fuel cell signal and to receive a plurality of analog signals, the analog-to-digital converter converting the fuel cell signal and the analog signals into a plurality of digital signals,
    a processor module connected to receive the digital signals and outputting a pulse width modulation signal based on the digital signals,
    a pulse width modulation module connected with the processor module to receive the pulse width modulation signal and for outputting a pulse width modulated power signal having a power level substantially equal to the power of the fuel cell, and
    a buck-boost circuit connected with the pulse width modulation module and having a buck power circuit that selectively adjusts the power level of the power signal,
    wherein the processor module is connected with the buck-boost circuit to selectively initiate the buck-boost circuit based on the plurality of digital signals,
    wherein analog-to-digital converter comprises a plurality of ports accepting a plurality of analog power signals and current signals that are converted to a plurality of digital power signals and current signals, the plurality of ports comprising a plurality of first channel ports, a plurality of second channel ports, a plurality of third channel ports, a field effect transistor temperature port connectable to receive a field effect transistor temperature signal, an ambient temperature port connectable to receive an ambient temperature signal, and a fuel cell voltage port connectable to receive a fuel cell input voltage from the fuel cell,
    wherein the plurality of first channel ports includes a first channel low input current port connectable to receive an analog first channel low input current signal, a first channel high input current port connectable to receive an analog first channel high input current signal, a first channel low output current port connectable to receive an analog first channel low output current signal, a first channel high output current port connectable to receive an analog first channel high output current signal, and a first channel output power port connectable to receive a first channel output power signal,
    wherein the plurality of second channel ports includes a second channel low input current port connectable to receive an analog second channel low input current signal, a second channel high input current port connectable to receive an analog second channel high input current signal, a second channel low output current port connectable to receive an analog second channel low output current signal, a second channel high output current port connectable to receive an analog second channel high output current signal, and a second channel output power port a second channel output power signal,
    wherein the plurality of third channel ports includes a third channel input current port connectable to receive an analog third channel input current signal, a third channel output current port connectable to receive an analog third channel output current signal, and a third channel output power port connectable to receive a third channel output power signal.

2. The DC-DC power converter of claim 1, wherein the processor module receives the plurality of digital power and current signals and outputs at least one of a first channel select signal, a second channel select signal, a third channel select signal, and the pulse width modulation signal.

3. A direct current-to-direct current (DC-DC) power converter comprising:
    an analog-to-digital converter for being in communication with a fuel cell and for receiving a fuel cell signal and a plurality of analog signals and for converting the fuel cell signal and the analog signals into a plurality of digital signals,
    a processor module for receiving the digital signals and for outputting a PWM frequency signal based on the digital signals,
    a PWM module being in communication with said processor module for receiving the PWM frequency signals and for outputting a PWM power signal having a power level substantially equal to the power of the fuel cell, and
    a buck-boost circuit being in communication with said PWM module and including a buck power circuit for adjusting the power level of the PWM power signal, and
    said processor module being in communication with said buck-boost circuit for selectively initiating said buck-boost circuit based on said plurality of digital signals,
    wherein said A-D converter further includes a plurality of ports for converting a plurality of analog power signals and current signals into a plurality of digital power signals and current signals,
    said plurality of ports including a plurality of first channel ports and a plurality of second channel ports and a plurality of third channel ports and a FET temperature port for receiving a FET temperature signal and an ambient temperature port for receiving an ambient temperature signal and a fuel cell voltage port for receiving a fuel cell input voltage from a fuel cell,
    said plurality of first channel ports including a first channel low input current port for receiving an analog first channel low input current signal and a first channel high input current port for receiving an analog first channel high input current signal and a first channel low output current port for receiving an analog first channel low output current signal and a first channel high output current port for receiving an analog first channel high output current signal and a first channel output power port for receiving a first channel output power signal, said plurality of second channel ports including a second channel low input current port for receiving an analog second channel low input current signal and a second channel high input current port for receiving an analog second channel high input current signal and a second channel low output current port for receiving an analog second channel low output current signal and a second channel high output current port for receiving an analog second channel high output current signal and a second channel output power port for receiving a second channel output power signal, said plurality of third channel ports including a third channel input current port for receiving an analog third channel input current signal and a third channel output current port for receiving an analog third channel output current signal and a third channel output power port for receiving a third channel output power signal.

4. The DC-DC converter of claim 3 wherein said processor module receives the plurality of digital power and current signals and for outputting at least one of a first channel select signal and a second channel select signal and a third channel select signal and the PWM frequency signal.

5. The DC-DC converter of claim 4 further comprising:

a crystal oscillator being in communication with said processor module for operating said processor module at a predetermined frequency, a pulse width modulation (PWM) module in communication with said processor module for being responsive to said PWM frequency signal and for outputting a PWM power signal having a power level substantially equal to the power of the fuel cell, a first channel field effect transistor (FET) being in communication with said PWM module for filtering the PWM power signal and for outputting a first channel filtered PWM power signal, a second channel FET being in communication with said PWM module for filtering the PWM power signal and for outputting a second channel filtered PWM power signal, a third channel FET being in communication with said PWM module for filtering the PWM power signal and for outputting a third channel filtered PWM power signal, a first boost power circuit being in communication with said first channel FET for receiving the first channel filtered PWM power signal and for increasing the power level of said first channel filtered PWM power signal to output a first channel output power signal having a power level ranging from 0 W to 3000 W, a buck power circuit being in communication with said first boost power circuit and said first channel FET for receiving the first channel filtered PWM power signal and for decreasing the power level of the first channel filtered PWM power signal to output a first channel output power signal having a power level ranging from 0 W to 3000 W, said processor module being in communication with said first boost power circuit and said buck power circuit for receiving said first channel output power signal indicating the power output by one of said first boost power circuit and said buck power circuit, a second boost power circuit being in communication with said PWM module for receiving the second channel filtered PWM power signal and for increasing the power level of the second channel filtered PWM power signal to output the second channel output power having a power level ranging from 0 W to 5000 W, said processor module being in communication with said second boost power circuit for receiving said second channel output power signal indicating the power output by said second boost power circuit, a third boost power circuit being in communication with said PWM module for receiving the third channel filtered PWM power signal and for increasing the power level of the third channel filtered PWM power signal to output the third channel output power having a power level ranging from 0 W to 400 W, said processor module being in communication with said third boost power circuit for receiving said third channel output power signal indicating the power output by said third boost power circuit, a first channel transistor being in communication with said processor module and said first channel FET for enabling said first channel FET based on the first channel select signal output by said processor module, a boost transistor being in communication with said processor module and said first boost power circuit for receiving a boost signal output by said processor module to enable said first boost power circuit when said first channel FET is enabled;

a buck transistor being in communication with said processor module and said buck power circuit for receiving a buck signal output by said processor module to enable said buck power circuit when said first channel FET is enabled, a second channel transistor being in communication with said processor module and said second channel FET for enabling said second channel FET based on the second channel select signal output by said processor module, a third channel transistor being in communication with said processor module and said third channel FET for enabling said third boost power circuit based on the third channel select signal output by said processor module, a first channel high input current sensor being in communication with said buck power circuit and said first channel high input current port for sensing high level current output from the fuel cell and for outputting the analog first channel low input current signal to said A-D converter, a first channel low input current sensor being in communication said buck power circuit and said first channel low input current port for sensing low level current output from fuel cell and for outputting the analog first channel low range input current signal to said A-D converter, a first channel high output current sensor being in communication with said first boost power circuit and said first channel high output current port for sensing high level current output by said first boost power circuit and for outputting the analog first channel high output current signal to said A-D converter, a first channel low output current sensor being in communication with said first boost power circuit and said first channel output current port for sensing low level current output by said first boost power circuit and for outputting the analog first channel low output current signal to said A-D converter, a second channel high input current sensor being in communication with said second boost power circuit and said second channel high input current port for sensing high level current output from the fuel cell and for outputting the analog second channel low input current signal to said A-D converter, a second channel low input current sensor being in communication with said second boost power circuit and said second channel low input current port for sensing low level current output from the fuel cell and for outputting the analog second channel low range input current signal to A-D converter, a second channel high output current sensor being in communication with said second boost power circuit and said second channel high output current port for sensing high level current output by said second boost power circuit and for outputting the analog second channel high output current signal to said A-D converter, a second channel low output current sensor being in communication with said second boost power circuit and said second channel low output current port for sensing low level current output by said second boost power circuit and for outputting the analog second channel low output current signal to said A-D converter, a third channel input current sensor being in communication with said third boost power circuit and said third channel input current port for sensing current output by the fuel cell and for outputting the analog third channel input current signal to said A-D converter, a third channel output current sensor being in communication with said third boost power circuit and said third channel output current port for sensing current output by said third boost power circuit and for outputting the analog third channel output current signal to said A-D converter, a serial communications module being in communication with said processor module for receiving at least one of a predetermined fuel cell maximum input power signal and a predetermined fuel cell minimum input voltage signal and a predetermined fuel cell maximum input voltage signal and a predetermined first and second and third channel minimum output current signal and a predetermined first and second and third channel maximum output current signal and a predetermined first and second and third channel output voltage signal and a predetermined first and second and third channel output power signal and a power ramp rate signal and a ratio signal from a first remotely located input device and for delivering the fuel cell signals and the predetermined signals and the power ramp rate signal and the ratio signal to said processor module, a broadcast communications module being in communication with said processor module for receiving at least one of the predetermined fuel cell maximum input power signal and the predetermined fuel cell minimum input voltage signal and the predetermined fuel cell maximum input voltage signal and the predetermined first and second and third channel minimum output current signal and the predetermined first and second and third channel maximum output current signal and a predetermined first and second and third channel output voltage signal and the predetermined first and second and third channel output power signal and the power ramp rate signal and the ratio signal from a second remotely located input device and for delivering the fuel cell signals and the predetermined signals and the power ramp rate signal and the ratio signal to said processor module, a liquid crystal display (LCD) module being in communication with said processor module and including a LCD interface for selecting and delivering the predetermined fuel cell maximum input power signal and the predetermined fuel cell minimum input voltage signal and the predetermined fuel cell maximum input voltage signal and the predetermined first and second and third channel minimum output current signal and the predetermined first and second and third channel maximum output current signal and a predetermined first and second and third channel output voltage signal and the predetermined first and second and third channel output power signal and the power ramp rate signal and the ratio signal from a second remotely located input device and for delivering the fuel cell signals and the predetermined signals and the power ramp rate signal and the ratio signal to said processor module, said LCD module including a LCD being in communication with said LCD interface for displaying at least one of the fuel cell signals and the predetermined signals and the power ramp rate signal selected using said LCD interface, a memory module for storing a predetermined fuel cell maximum input power value associated with the fuel cell maximum input power signal and a fuel cell minimum input voltage value associated with the fuel cell minimum input voltage signal and a fuel cell maximum input voltage value associated with the fuel cell maximum input voltage signal and a predetermined first and second and third channel minimum output current value associated with the respective predetermined first and second and third channel minimum output current signal and a predetermined first and second and third channel maximum output current value associated with the respected predetermined first and second and third channel maximum output current signal and a predetermined first and second and third channel output voltage value associated with the respective predetermined first and second and third channel output voltage signal and a predetermined first and second and third channel output power value associated with the respective first and second and third channel output power signal and a predetermined power ramp rate value associated with the power ramp rate signal and a predetermined ratio value associated with the ratio signal, and said processor module being in communication with said memory module for comparing at least one of the predetermined stored values to at least one of the plurality of digital power and current signals and for initiating at least one of said first channel transistor and said boost transistor and said buck transistor and said second channel transistor and said third channel transistor to output at least one of the first channel output power and the second channel output power and the third channel output power and the first channel output voltage and the second channel output voltage and the third channel output voltage and the first channel output current and the second channel output current and the third channel output current according to at least one of the predetermined stored values.

6. A direct current-to-direct current (DC-DC) power converter comprising;

an analog-to-digital (A-D) converter for converting a plurality of analog power signals and current signals into a plurality of digital power signals and current signals and including a plurality of first channel ports and a plurality of second channel ports and a plurality of third channel ports and a FET temperature port for receiving a FET temperature signal and an ambient temperature port for receiving an ambient temperature signal and a fuel cell voltage port for receiving a fuel cell input voltage from a fuel cell, said plurality of first channel ports including a first channel low input current port for receiving an analog first channel low input current signal and a first channel high input current port for receiving an analog first channel high input current signal and a first channel low output current port for receiving an analog first channel low output current signal and a first channel high output current port for receiving an analog first channel high output current signal and a first channel output power port for receiving a first channel output power signal, said plurality of second channel ports including a second channel low input current port for receiving an analog second channel low input current signal and a second channel high input current port for receiving an analog second channel high input current signal and a second channel low output current port for receiving an analog second channel low output current signal and a second channel high output current port for receiving an analog second channel high output current signal and a second channel output power port for receiving a second channel output power signal, said plurality of third channel ports including a third channel input current port for receiving an analog third channel input current signal and a third channel output current port for receiving an analog third channel output current signal and a third channel output power port for receiving a third channel output power signal, a processor module for receiving the plurality of digital power and current signals and for outputting at least one of a first channel select signal and a second channel select signal and a third channel select signal and a PWM frequency signal and, a crystal oscillator being in communication with said processor module for operating said processor module at a predetermined frequency, a pulse width modulation (PWM) module in communication with said processor module for being responsive to said PWM frequency signal and for outputting a PWM power signal having a power level substantially equal to the power of the fuel cell, a first channel field effect transistor (FET) being in communication with said PWM module for filtering the PWM power signal and for outputting a first channel filtered PWM power signal, a second channel FET being in communication with said PWM module for filtering the PWM power signal and for outputting a second channel filtered PWM power signal, a third channel FET being in communication with said PWM module for filtering the PWM power signal and for outputting a third channel filtered PWM power signal, a first boost power circuit being in communication with said first channel FET for receiving the first channel filtered PWM power signal and for increasing the power level of said first channel filtered PWM power signal to output a first channel output power signal having a power level ranging from 0 W to 3000 W, a buck power circuit being in communication with said first boost power circuit and said first channel FET for receiving the first channel filtered PWM power signal and for decreasing the power level of the first channel filtered PWM power signal to output a first channel output power signal having a power level ranging from 0 W to 3000 W, said processor module being in communication with said first boost power circuit and said buck power circuit for receiving said first channel output power signal indicating the power output by one of said first boost power circuit and said buck power circuit, a second boost power circuit being in communication with said PWM module for receiving the second channel filtered PWM power signal and for increasing the power level of the second channel filtered PWM power signal to output the second channel output power having a power level ranging from 0 W to 5000 W, said processor module being in communication with said second boost power circuit for receiving said second channel output power signal indicating the power output by said second boost power circuit, a third boost power circuit being in communication with said PWM module for receiving the third channel filtered PWM power signal and for increasing the power level of the third channel filtered PWM power signal to output the third channel output power having a power level ranging from 0 W to 400 W, said processor module being in communication with said third boost power circuit for receiving said third channel output power signal indicating the power output by said third boost power circuit, a first channel transistor being in communication with said processor module and said first channel FET for enabling said first channel FET based on the first channel select signal output by said processor module, a boost transistor being in communication with said processor module and said first boost power circuit for receiving a boost signal output by said processor module to enable said first boost power circuit when said first channel FET is enabled;

a buck transistor being in communication with said processor module and said buck power circuit for receiving a buck signal output by said processor module to enable said buck power circuit when said first channel FET is enabled, a second channel transistor being in communication with said processor module and said second channel FET for enabling said second channel FET based on the second channel select signal output by said processor module, a third channel transistor being in communication with said processor module and said third channel FET for enabling said third boost power circuit based on the third channel select signal output by said processor module, a first channel high input current sensor being in communication with said buck power circuit and said first channel high input current port for sensing high level current output from the fuel cell and for outputting the analog first channel low input current signal to said A-D converter, a first channel low input current sensor being in communication said buck power circuit and said first channel low input current port for sensing low level current output from fuel cell and for outputting the analog first channel low range input current signal to said A-D converter, a first channel high output current sensor being in communication with said first boost power circuit and said first channel high output current port for sensing high level current output by said first boost power circuit and for outputting the analog first channel high output current signal to said A-D converter, a first channel low output current sensor being in communication with said first boost power circuit and said first channel output current port for sensing low level current output by said first boost power circuit and for outputting the analog first channel low output current signal to said A-D converter, a second channel high input current sensor being in communication with said second boost power circuit and said second channel high input current port for sensing high level current output from the fuel cell and for outputting the analog second channel low input current signal to said A-D converter, a second channel low input current sensor being in communication with said second boost power circuit and said second channel low input current port for sensing low level current output from the fuel cell and for outputting the analog second channel low range input current signal to A-D converter, a second channel high output current sensor being in communication with said second boost power circuit and said second channel high output current port for sensing high level current output by said second boost power circuit and for outputting the analog second channel high output current signal to said A-D converter, a second channel low output current sensor being in communication with said second boost power circuit and said second channel low output current port for sensing low level current output by said second boost power circuit and for outputting the analog second channel low output current signal to said A-D converter, a third channel input current sensor being in communication with said third boost power circuit and said third channel input current port for sensing current output by the fuel cell and for outputting the analog third channel input current signal to said A-D converter, a third channel output current sensor being in communication with said third boost power circuit and said third channel output current port for sensing current output by said third boost power circuit and for outputting the analog third channel output current signal to said A-D converter, a serial communications module being in communication with said processor module for receiving at least one of a predetermined fuel cell maximum input power signal and a predetermined fuel cell minimum input voltage signal and a predetermined fuel cell maximum input voltage signal and a predetermined first and second and third channel minimum output current signal and a predetermined first and second and third channel maximum output current signal and a predetermined first and second and third channel output voltage signal and a predetermined first and second and third channel output power signal and a power ramp rate signal and a ratio signal from a first remotely located input device and for delivering the fuel cell signals and the predetermined signals and the power ramp rate signal and the ratio signal to said processor module, a broadcast communications module being in communication with said processor module for receiving at least one of the predetermined fuel cell maximum input power signal and the predetermined fuel cell minimum input voltage signal and the predetermined fuel cell maximum input voltage signal and the predetermined first and second and third channel minimum output current signal and the predetermined first and second and third channel maximum output current signal and a predetermined first and second and third channel output voltage signal and the predetermined first and second and third channel output power signal and the power ramp rate signal and the ratio signal from a second remotely located input device and for delivering the fuel cell signals and the predetermined signals and the power ramp rate signal and the ratio signal to said processor module, a liquid crystal display (LCD) module being in communication with said processor module and including a LCD interface for selecting and delivering the predetermined fuel cell maximum input power signal and the predetermined fuel cell minimum input voltage signal and the predetermined fuel cell maximum input voltage signal and the predetermined first and second and third channel minimum output current signal and the predetermined first and second and third channel maximum output current signal and a predetermined first and second and third channel output voltage signal and the predetermined first and second and third channel output power signal and the power ramp rate signal and the ratio signal from a second remotely located input device and for delivering the fuel cell signals and the predetermined signals and the power ramp rate signal and the ratio signal to said processor module, said LCD module including a LCD being in communication with said LCD interface for displaying at least one of the fuel cell signals and the predetermined signals and the power ramp rate signal selected using said LCD interface, a memory module for storing a predetermined fuel cell maximum input power value associated with the fuel cell maximum input power signal and a fuel cell minimum input voltage value associated with the fuel cell minimum input voltage signal and a fuel cell maximum input voltage value associated with the fuel cell maximum input voltage signal and a predetermined first and second and third channel minimum output current value associated with the respective predetermined first and second and third channel minimum output current signal and a predetermined first and second and third channel maximum output current value associated with the respected predetermined first and second and third channel maximum output current signal and a predetermined first and second and third channel output voltage value associated with the respective predetermined first and second and third channel output voltage signal and a predetermined first and second and third channel output power value associated with the respective first and second and third channel output power signal and a predetermined power ramp rate value associated with the power ramp rate signal and a predetermined ratio value associated with the ratio signal, and said processor module being in communication with said memory module for comparing at least one of the predetermined stored values to at least one of the plurality of digital power and current signals and for initiating at least one of said first channel transistor and said boost transistor and said buck transistor and said second channel transistor and said third channel transistor to output at least one of the first channel output power and the second channel output power and the third channel output power and the first channel output voltage and the second channel output voltage and the third channel output voltage and the first channel output current and the second channel output current and the third channel output current according to at least one of the predetermined stored values.

\* \* \* \* \*